(12) United States Patent
McFadden et al.

(10) Patent No.: US 7,931,299 B2
(45) Date of Patent: Apr. 26, 2011

(54) LOW RISK DEPLOYMENT AIRBAG CUSHION

(75) Inventors: Stephanie Marie McFadden, Oxford, MI (US); Paul Alan Baker, Royal Oak, MI (US)

(73) Assignee: TK Holdings, Inc., Auburn Hills, MI (US)

( * ) Notice: Subject to any disclaimer, the term of this patent is extended or adjusted under 35 U.S.C. 154(b) by 289 days.

(21) Appl. No.: 12/149,347

(22) Filed: Apr. 30, 2008

(65) Prior Publication Data
US 2008/0203713 A1 Aug. 28, 2008

Related U.S. Application Data

(63) Continuation-in-part of application No. 11/523,810, filed on Sep. 20, 2006.

(60) Provisional application No. 60/718,746, filed on Sep. 21, 2005, provisional application No. 60/725,636, filed on Oct. 13, 2005, provisional application No. 60/750,799, filed on Dec. 16, 2005, provisional application No. 60/750,804, filed on Dec. 16, 2005, provisional application No. 60/745,024, filed on Apr. 18, 2006.

(51) Int. Cl.
*B60R 21/23* (2006.01)
*B60R 21/239* (2006.01)

(52) U.S. Cl. ..................... 280/743.2; 280/739

(58) Field of Classification Search .................. 280/739, 280/743.1, 743.2
See application file for complete search history.

(56) References Cited

U.S. PATENT DOCUMENTS

| 5,213,361 | A | 5/1993 | Satoh et al. |
| 5,280,953 | A | 1/1994 | Wolanin et al. |
| 5,405,166 | A | 4/1995 | Rogerson |
| 5,468,013 | A | 11/1995 | Gille |
| 5,501,488 | A | 3/1996 | Saderholm et al. |
| 5,513,879 | A | 5/1996 | Patel et al. |
| 5,560,649 | A | 10/1996 | Saderholm et al. |
| 5,603,526 | A | 2/1997 | Buchanan |
| 5,704,639 | A | 1/1998 | Cundill et al. |
| 5,853,191 | A | 12/1998 | Lachat |
| 5,931,497 | A | 8/1999 | Fischer |
| 6,139,052 | A | 10/2000 | Preamprasitchai |
| 6,247,726 | B1 | 6/2001 | Ryan |
| 6,308,983 | B1 | 10/2001 | Sinnhuber |
| 6,648,371 | B2 | 11/2003 | Vendely et al. |
| 6,659,499 | B2 | 12/2003 | Jenkins |
| 6,669,231 | B2 | 12/2003 | Ryan |
| 6,676,158 | B2 | 1/2004 | Ishikawa |
| 6,746,045 | B2 | 6/2004 | Short et al. |
| 6,773,030 | B2 | 8/2004 | Fischer |

(Continued)

FOREIGN PATENT DOCUMENTS

JP 09-142239 3/1997

(Continued)

*Primary Examiner* — Paul N. Dickson
*Assistant Examiner* — George D. Spisich
(74) *Attorney, Agent, or Firm* — Foley & Lardner LLP

(57) ABSTRACT

The application relates to an airbag with a venting assembly. An air bag cushion can include at least one panel and a tether that forms the venting assembly. The tether can include an attachment portion to attach the tether to a panel of the air bag cushion, an opening, at least one passive vent, and a discrete vent. The passive venting system can be formed by folding the tether over upon itself so that the opening and vents substantially lie above and below one another.

20 Claims, 6 Drawing Sheets

U.S. PATENT DOCUMENTS

| | | | |
|---|---|---|---|
| 6,796,583 B2 * | 9/2004 | Keshavaraj | 280/743.2 |
| 6,799,777 B2 | 10/2004 | Hawthorn et al. | |
| 6,830,265 B2 | 12/2004 | Ford | |
| 6,832,778 B2 * | 12/2004 | Pinsenschaum et al. | 280/739 |
| 6,834,886 B2 | 12/2004 | Hasebe et al. | |
| 6,869,101 B2 | 3/2005 | White et al. | |
| 6,918,613 B2 | 7/2005 | Short et al. | |
| 6,932,385 B2 * | 8/2005 | Hawthorn et al. | 280/739 |
| 6,945,559 B2 | 9/2005 | Kassman et al. | |
| 6,959,945 B2 | 11/2005 | Fischer et al. | |
| 6,991,258 B2 | 1/2006 | Hawthorn et al. | |
| 7,000,943 B2 | 2/2006 | Hasebe et al. | |
| 7,264,268 B2 | 9/2007 | Ehrke | |
| 7,445,237 B2 | 11/2008 | Boyle, III et al. | |
| 7,497,469 B2 * | 3/2009 | Fischer et al. | 280/743.2 |
| 2001/0033072 A1 | 10/2001 | Kumagai et al. | |
| 2003/0218325 A1 | 11/2003 | Hasebe et al. | |
| 2004/0012180 A1 | 1/2004 | Hawthorn et al. | |
| 2004/0017069 A1 | 1/2004 | Fischer | |
| 2004/0051285 A1 | 3/2004 | Fischer | |
| 2004/0051286 A1 | 3/2004 | Fischer et al. | |
| 2004/0056459 A1 | 3/2004 | Kassman et al. | |
| 2004/0145160 A1 | 7/2004 | Hasebe et al. | |
| 2004/0145161 A1 | 7/2004 | Hasebe et al. | |
| 2004/0150200 A1 | 8/2004 | Yamada et al. | |
| 2004/0155439 A1 | 8/2004 | Hasebe et al. | |
| 2004/0155440 A1 | 8/2004 | Hasebe et al. | |
| 2004/0155443 A1 | 8/2004 | Ford | |
| 2004/0160041 A1 | 8/2004 | Hasebe et al. | |
| 2004/0188990 A1 | 9/2004 | Short et al. | |
| 2005/0029781 A1 | 2/2005 | Enders et al. | |
| 2005/0040634 A1 | 2/2005 | Braun et al. | |
| 2005/0040635 A1 | 2/2005 | Hawthorn et al. | |
| 2005/0098990 A1 | 5/2005 | Pinsenschaum et al. | |
| 2005/0104339 A1 | 5/2005 | Hasebe et al. | |
| 2005/0110249 A1 | 5/2005 | Hasebe et al. | |
| 2005/0127648 A1 | 6/2005 | Fischer et al. | |
| 2005/0146122 A1 | 7/2005 | Gould et al. | |
| 2005/0161918 A1 | 7/2005 | Bito | |
| 2005/0184489 A1 | 8/2005 | Kobayashi | |
| 2005/0194769 A1 | 9/2005 | Abe | |
| 2005/0236822 A1 | 10/2005 | Rose et al. | |
| 2005/0248137 A1 | 11/2005 | Delventhal et al. | |
| 2006/0125215 A1 | 6/2006 | Clarke et al. | |
| 2006/0125219 A1 | 6/2006 | Kokeguchi et al. | |
| 2006/0181067 A1 | 8/2006 | Maripudi | |
| 2006/0237953 A1 * | 10/2006 | Abe | 280/729 |
| 2007/0108750 A1 * | 5/2007 | Bauer et al. | 280/740 |
| 2007/0145729 A1 | 6/2007 | Ishiguro et al. | |
| 2008/0073892 A1 | 3/2008 | Rose et al. | |
| 2008/0179866 A1 | 7/2008 | Maertens | |

FOREIGN PATENT DOCUMENTS

| | | |
|---|---|---|
| JP | 2005-014861 | 1/2005 |
| JP | 2005-014862 | 1/2005 |
| JP | 2005-014863 | 1/2005 |
| JP | 2005-014864 | 1/2005 |

* cited by examiner

LOW RISK DEPLOYMENT AIRBAG CUSHION

CROSS-REFERENCE TO RELATED PATENT APPLICATIONS

This application is a Continuation-in-Part of U.S. application Ser. No. 11/523,810, filed Sep. 20, 2006, which is hereby incorporated by reference in its entirety.

BACKGROUND

The application relates to an airbag with a venting assembly. More specifically, the application relates to fabric tabs that are incorporated into the valve sheet for a passive venting system.

Airbags may include venting assemblies to release inflation fluid out of the airbag. Generally, venting assemblies are located in the airbag housing adjacent the inflator.

Some airbag systems utilize active sensor and/or control systems to control the deployment of the airbag during an accident involving a rear facing infant seat (RFIS) or out-of-position (OOP) occupant that will minimize potential injuries to occupants from the airbag itself. Such electronic sensor and control systems can be expensive and, more significantly, the complexity of the sensor and control systems may make high reliability difficult to achieve in some circumstances. These conventional "active" assemblies may also require a significant amount of space in an airbag system.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DESCRIPTION

Figure 1:
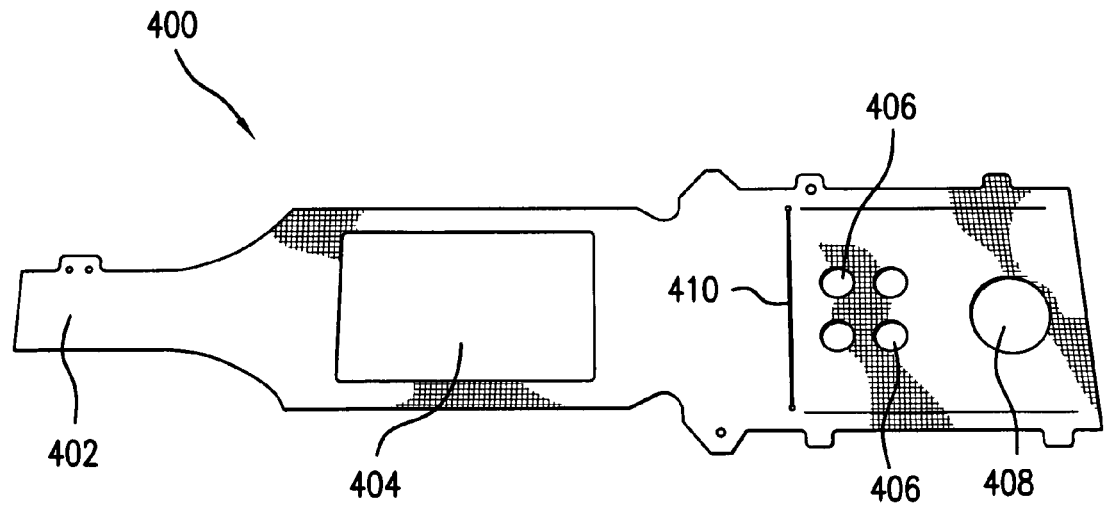
FIG. 1 is a top view of a tether for a passive venting system, according to another embodiment.

Airbag passive venting systems are advantageous because they do not require costly equipment to manufacture or install. Passive venting systems are also advantageous because the mechanism for controlling the venting system is simpler than an electronic control system and may be more reliable than an electronic control system.

According to an exemplary embodiment, an occupant protection apparatus is provided. The apparatus comprises: an inflatable airbag including a panel, wherein the panel includes a first vent opening through which inflation fluid may escape out of the airbag; a moveable valve sheet overlying the first vent opening and including a second vent opening movable relative to the first vent opening, the valve sheet being fixed to a surface of the panel at opposite ends; and a valve guide to guide movement of the valve sheet relative to the panel, wherein the valve sheet is configured to slide between the valve guide and the panel. One end of the valve sheet moves with the panel during inflation of the airbag to move the second vent opening relative to the first vent opening. The first and a second end of the valve sheet are fixed to the panel during and after inflation of the airbag. The valve sheet includes at least one breakaway tab to attach the valve sheet to the fabric panel prior to and during inflation of the airbag, the breakaway tab configured to break apart and allow the valve sheet to move during inflation of the airbag to move the second vent opening relative to the first vent opening. The tab is cut from the valve sheet fabric.

According to an embodiment, an airbag with a venting assembly comprises a cushion panel with at least one vent opening and a valve sheet with at least one vent opening and at least one tear tab, wherein each tear tab is attached to the panel, wherein the vent openings of the panel and the vent openings of the valve sheet are configured to align with one another at least for a period of time during deployment of the airbag, wherein the tear tabs are configured to break if the airbag does not come into contact with an object or out of position occupant during deployment of the airbag.

A tear tab used in the embodiments and examples described herein can be designed in accordance with U.S. application Ser. Nos. 11/523,810, and 12/010,211, filed Jan. 22, 2008, which is hereby incorporated by reference in its entirety. Furthermore, the passive venting assemblies used in the embodiments and examples described herein can be designed in accordance with U.S. application Ser. No. 11/523,810, filed Sep. 20, 2006 and U.S. application Ser. No. 12/010,211.

According to yet another embodiment, the breakaway or tear tab is sewn to the panel of the airbag. In an embodiment, the breakaway tab has a substantially hourglass shape.

In an embodiment, the tear tab comprises slits such that fibers of the tear tab adjacent the slit are discontinuous.

According to another embodiment, the tear tab comprises slits that are cut at approximately a 45 degree angle to an imaginary line extending from a lengthwise side edge of the tab. Alternatively, the slit may be cut at approximately a 45 degree angle from a line extending from a lengthwise side edge of an elongated vent in the valve sheet.

In another embodiment, the tear tab is located at a distal end of the valve sheet. In yet another embodiment, a pocket encloses the valve sheet and tear tabs.

According to another embodiment, a passive venting assembly is designed to expand to the full volume of the air bag cushion if the air bag does not encounter an object during inflation. The passive venting assembly can include a tether to control the flow of inflation gas from the air bag cushion. The tether can be attached to a most rearward portion of the air bag cushion in relation to a vehicle that the air bag cushion is located in. Such a tether attachment location can permit the tether to interact with the object when the air bag cushion first contacts the object. If the air bag does encounter an object, or an object restricts the inflation path of the air bag, the tether of the passive venting assembly is designed so that vents in the air bag cushion are not blocked or substantially blocked, permitting inflation gas to vent from the air bag cushion. Such a situation can be considered a Low Risk Deployment (LRD) situation in which additional venting is desired. If the air bag cushion does not encounter an object the air bag cushion inflates, as under standard deployment conditions. For example, the tether can be designed to move relative to the air bag cushion when no object is encountered so that the tether covers at least some vents in the air bag cushion. Such a passive venting assembly can be provided, for example, for a three piece air bag cushion. The air bag cushion could be used, for example, as a passenger side air bag (PAB).

According to this embodiment, an air bag with at least one venting assembly can comprise at least one air bag panel and a tether that includes an opening and at least one vent. The tether can be folded so that the opening and the vent overlay or substantially overlay one another.

Embodiments will now be discussed with reference to the drawings.

FIG. 1 shows a top view of a tether 400 for a passive venting system, according to another embodiment. As shown in the example of FIG. 1, the tether 400 can be formed with a single-piece construction or the tether can be formed by one or more pieces. The tether can include an attachment portion 402 to attach the tether 400 to an air bag cushion, an opening 404, at least one passive vent 406, and a discrete vent 408.

Figure 2:
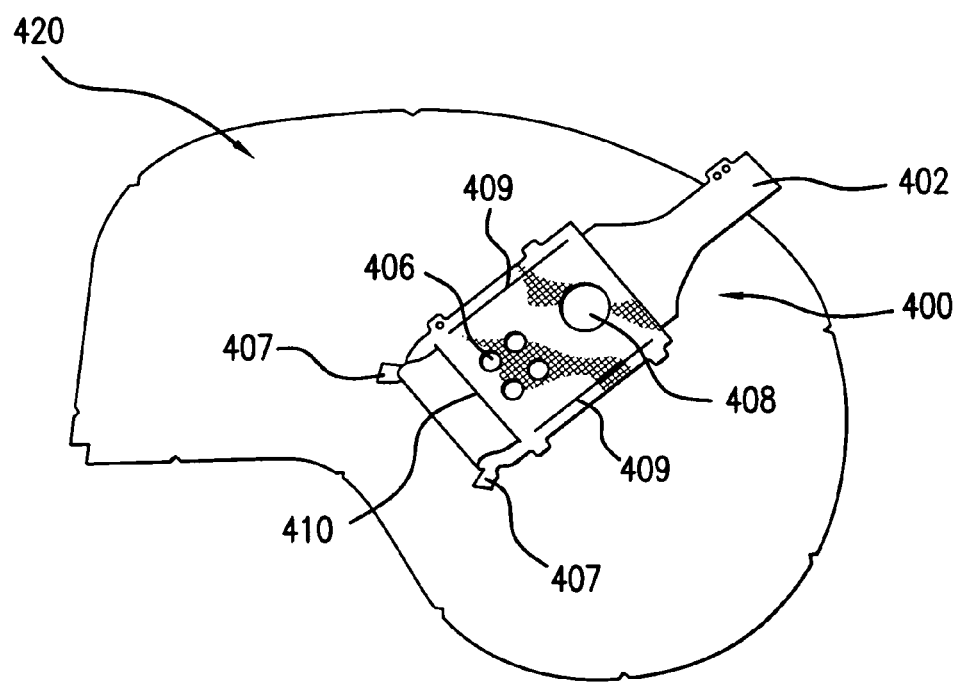
FIG. 2 is a top view of an air bag panel with a passive venting system, according to an embodiment.

FIG. 2 shows a top view of an air bag panel 420 to which the tether 400 has been attached to form a passive venting system. As shown in the example of FIG. 2, a passive venting system can be formed by folding the tether 400 over upon itself so that the opening 404 and vents 406, 408 substantially lie above and below one another. The air bag panel 420 can be one of several panels for an air bag cushion, such as, for example, a three piece PAB. The example of FIG. 2 shows the passive venting system in an open position, such as before deployment of an air bag cushion.

The tether 400 can be connected to the air bag panel 420 to fix at least a portion of the tether 400 relative the air bag panel 420. For example, the tether 400 can be sewn along edges 409 so that a portion of the tether is fixed relative the air bag panel 420. In a further example, a portion of the tether 400 including passive vents 406 and the discrete vent 408 can be sewn along edges 409 so that the vents 406, 408 in the tether 400 align with vents in the air bag panel 420 and so that this portion of the tether 400 does not substantially move during deployment of the air bag cushion. According to this example, a portion of the tether 400 including the opening 404 is folded over the portion with the vents 406, 408 so that opening 404 can move relative to the vents 406, 408 during deployment of an air bag cushion. According to a further example, a slit 410 can be cut in the tether 400 so that the portion of the tether with the opening 404 can be inserted into the slit 410 and underneath the portion of the tether 400 with vents 406, 408. In this way, the sides of the tether 400 can be sewn along edges 409 to form a pocket underneath the tether 400, which the portion of the tether with the opening 404 can be inserted into through the slit 410. Such a pocket can advantageously locate the tether 400 relative to the air bag panel 420 so that the tether 400 does not experience any unnecessary movements during deployment of the air bag cushion. For example, such a pocket can be used to minimize or prevent flapping of the tether 400 relative to the air bag panel 420, which can interfere with the function of the tether 400 and venting through vents 406, 408. The passive vent assembly can also include deployment delay mechanisms 407 that can function to hold the tether 400 in place and delay the deployment or movement of the tether 400 relative to the air bag panel 420. The deployment delay mechanisms 407 can be, for example, tear tabs as discussed in the examples herein. Such tear tabs can be designed to rupture or tear once a predetermined amount of force is exerted upon the tether 400 and tear tabs by the deployment of the air bag cushion.

Figure 3:
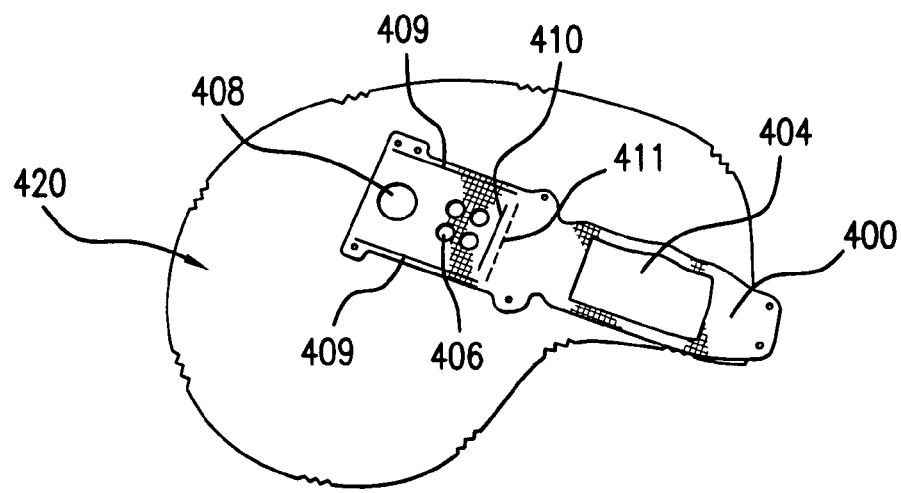
FIG. 3 is a top view of an air bag panel with a tether in an early stage of assembling a passive vent assembly, according to an embodiment.
Figure 4:
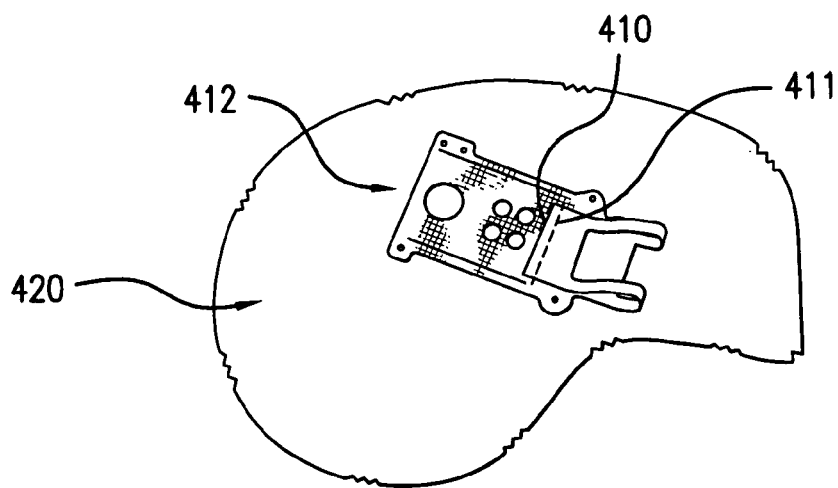
FIG. 4 is a top view of the air bag panel and tether of FIG. 3 in a later stage of assembling the passive vent assembly.
Figure 5:
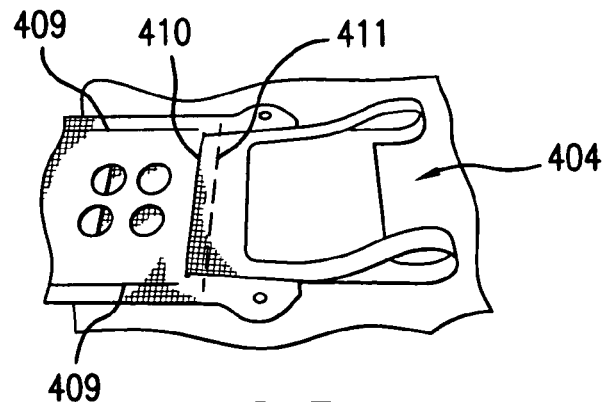
FIG. 5 is an enlarged top view of the air bag panel and tether of FIG. 4.

FIG. 3 shows a top view of an air bag panel 420 and a tether 400 in an early stage of forming a passive vent assembly, according to an embodiment. As shown in the example of FIG. 3, the tether 400 can be attached to the air bag panel 420 along edges 409. The tether 400 can also be attached to the air bag panel 420 along transverse joint 411 to further connect the tether 400 and hold it in position. The transverse joint 411 can be formed, by example by sewing or other joining methods used in the art. In a further stage of assembling the passive vent assembly, as shown in the example of FIG. 4, a slit 410 can be formed in the portion of the tether attached to the air bag panel 420 and a distal end of the tether 400 can then be inserted into the slit 410 and underneath the portion of the tether 400 joined to the air bag panel 420, which can also be the portion of the tether that includes vents 406, 408. FIG. 5 shows an enlarged view of FIG. 4, in which the distal end of the tether 400 has been inserted into the slit 410. After insertion of the distal end of the tether 400 into the slit 410 the distal end can be advanced underneath the portion of the tether joined to the air bag panel 420 until the distal end emerges from an open end 412 of the passive vent assembly. The distal end of the tether 400, which can include an attachment portion 402, can then be attached to an air bag cushion and any deployment delay mechanisms 407 can be joined to the air bag panel 420. The transverse joint 411 is shown with dashed lines in the examples of FIGS. 3-5 because the transverse joint 411 is covered by the distal end of the tether 400 that has been inserted into the slit 410.

The attachment portion 402 can be attached to a most rearward portion of an air bag cushion in relation to a vehicle that the air bag cushion is located in. Such a location of the attachment portion 402 can permit the tether 400 to interact with an object, such as an out of position occupant in a vehicle, that the air bag cushion encounters or contacts upon first contact with the object. Because the attachment portion 402 is attached to a portion of the air bag cushion, such as the most rearward portion of the air bag cushion, as the air bag cushion inflates the air bag cushion pulls on the attachment portion 402 and the tether 400, causing the portion of the tether with the opening 404 to move relative to the portion of the tether with vents 406, 408. According to such an arrangement, when the most rearward part of the air bag cushion encounters or contacts an object during deployment of the air bag cushion, the tether 400 will be immediately affected by the contact of the air bag cushion with the object. For example, such an encountered or contacted object can cause the most rearward portion of the air bag cushion to be forced inward, causing the force applied to the attachment portion 402 and tether 400 to be lessened or nullified so that the portion of the tether including opening 404 ceases or substantially ceases to move relative to the portion of the tether with vents 406, 408. If the air bag cushion does encounter an object, or an object restricts the inflation path of the air bag cushion, the tether 400 of the passive venting assembly is designed so that the passive vents 406, and discrete vent 408, in the air bag cushion are not closed, blocked, or substantially blocked, permitting inflation gas to vent from the air bag cushion.

Figure 6:
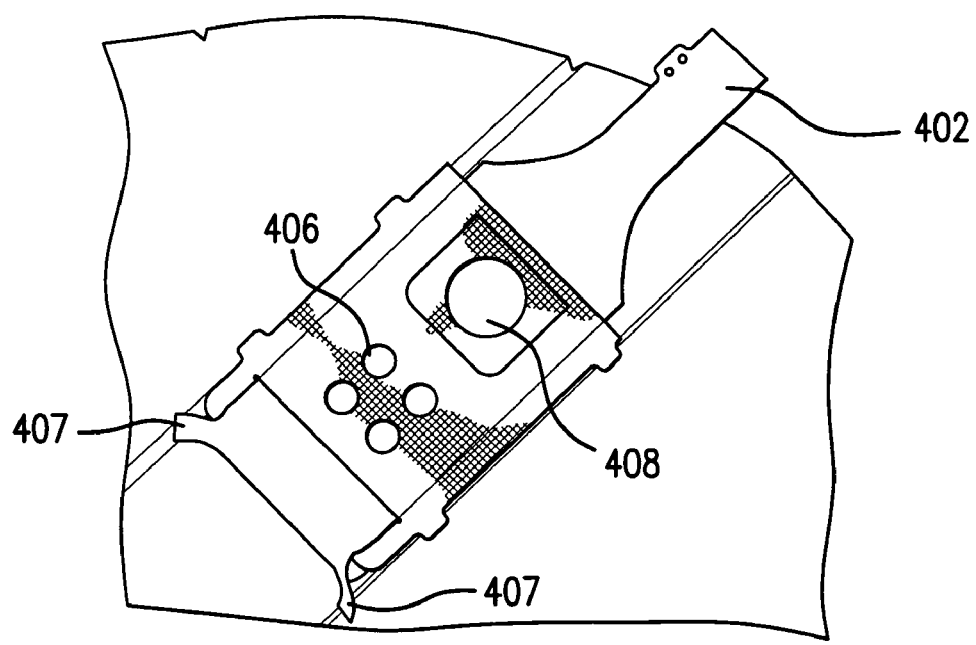
FIG. 6 is a top view of a passive venting assembly in an open position, according to an embodiment.
Figure 7:
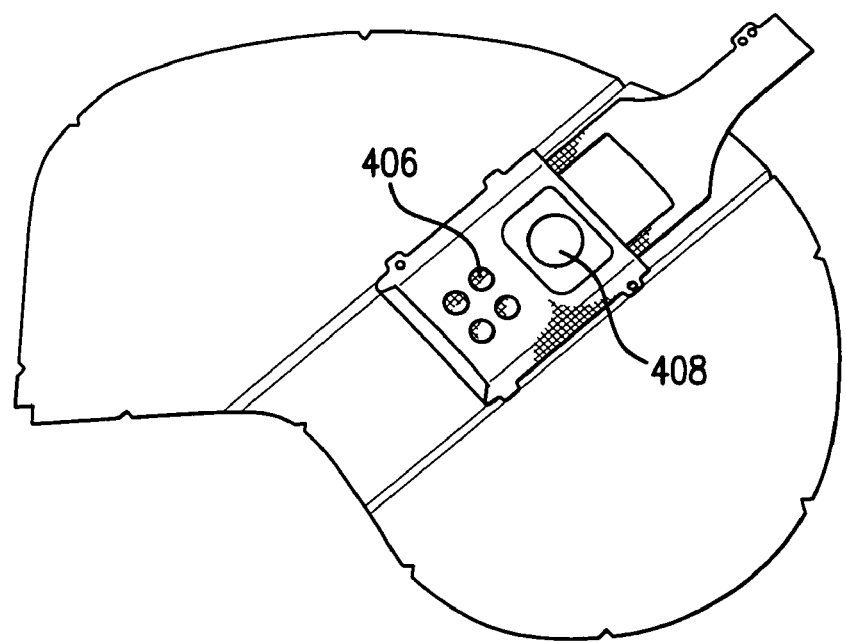
FIG. 7 is a top view of the passive venting assembly of FIG. 6 in a closed position, according to an embodiment.

FIG. 6 shows a top view of the passive venting assembly in an open position, such as before deployment of an air bag cushion. In such a state, the portion of the tether including the opening 404 is positioned relative to the portion of the tether with vents 406, 408 so that the passive vents 406 and the discrete vent 408 are open. FIG. 7 shows a top view of the passive venting assembly in a closed position, such as when the air bag position has been fully deployed without encountering or contacting an object. In the example shown in FIG. 7, passive vents 406 have been closed or substantially closed because the portion of the tether including the opening 404 has moved relative to the portion of the tether with vents 406, 408 so that the material of the tether 400 blocks or substantially blocks the passive vents 406. Such movement of the portion of the tether including the opening 404 relative to the portion of the tether with vents 406, 408 can be accomplished by the air bag cushion pulling on the tether 400 via attachment portion 402, as described in the examples above. As shown in the example of FIG. 7, the passive venting assembly can be designed so that the passive vents 406 are closed or substantially closed when the air bag cushion is fully deployed and the discrete vent 408 remains open or substantially open.

Figure 8:
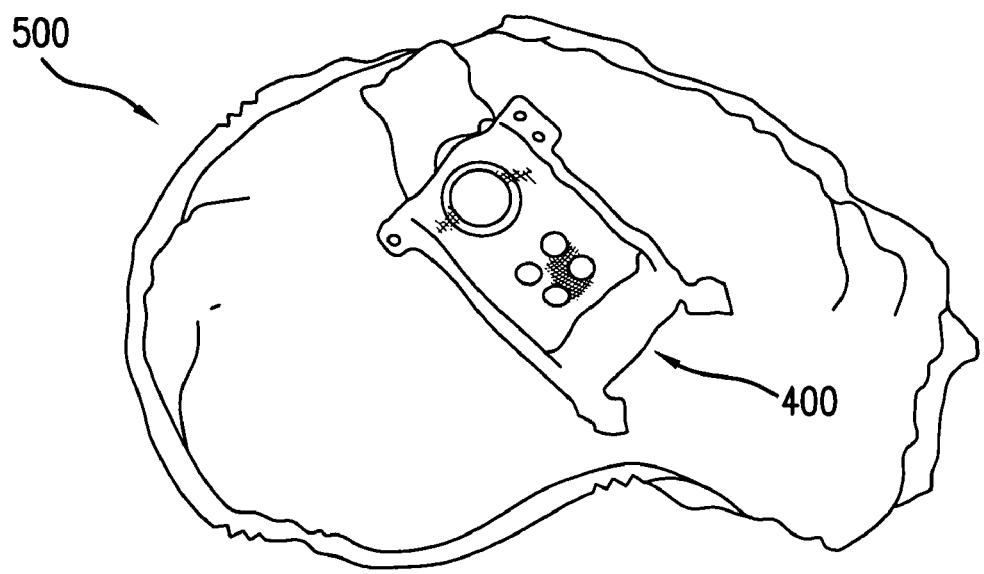
FIG. 8 is a top view of an assembled air bag cushion with a passive venting assembly with the air bag cushion turned inside-out, according to an embodiment.
Figure 9:
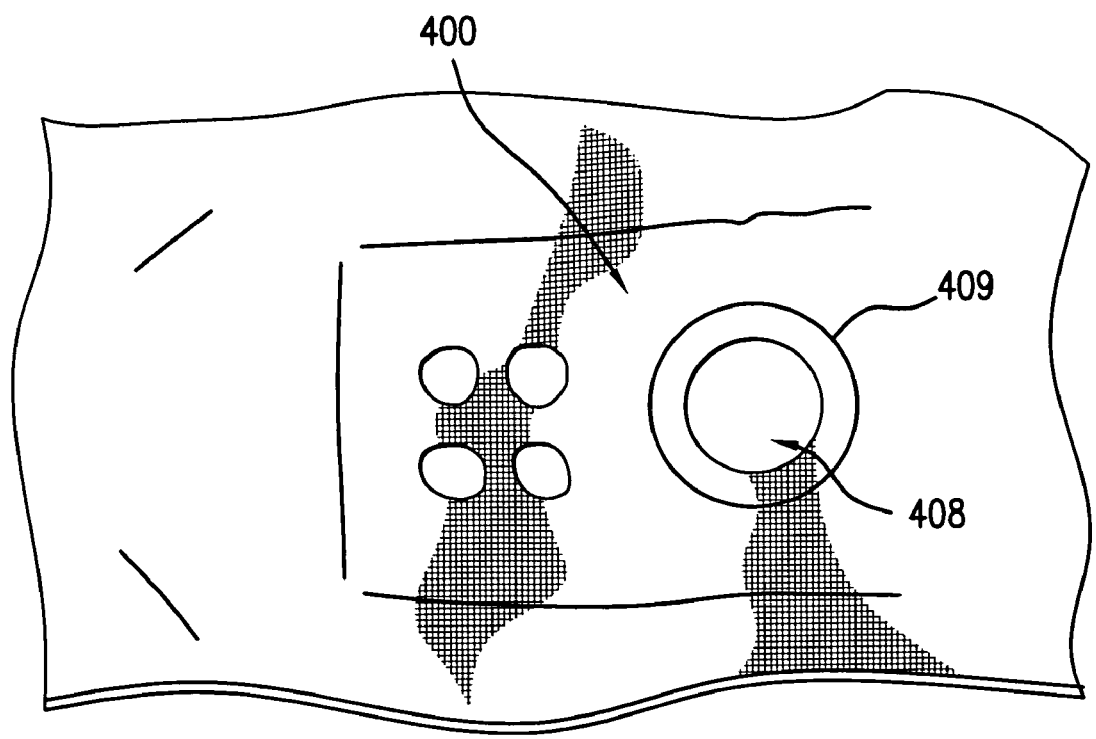
FIG. 9 is a top view of the external portion of an assembled air bag cushion with a passive venting assembly, according to an embodiment.

FIG. 8 shows an example of an assembled air bag cushion 500 with a passive venting assembly, as described in the examples herein, with the air bag cushion turned inside-out. FIG. 9 shows a top view of the external portion of the assembled air bag cushion with the passive venting assembly. As shown in the example of FIG. 9, the passive venting assembly can include a joint 409 around the discrete vent 408. Such a joint 409 can be formed to control the movement of the tether 400 during deployment of an air bag cushion. For example, the joint 409 can be formed to prevent the portion of the tether including the opening 404 from moving completely past the discrete vent 408. In such an example, the opening 404 can be prevented from moving past the discrete vent 408 because an edge of the opening 404 formed by the material of the tether 400 abuts against the joint 409, preventing the portion of the tether with the opening 404 from moving any further relative to the discrete vent 408 and maintaining the opening 404 in a position above the discrete vent 408 so that the discrete vent 408 remains open or substantially open. The joint 409 can be formed, for example, by joining the air bag panel 420 to the portion of the tether with the vents 406, 408. In another example the joint 409 can be formed by sewing or another form of bonding used in the art.

Figure 10:
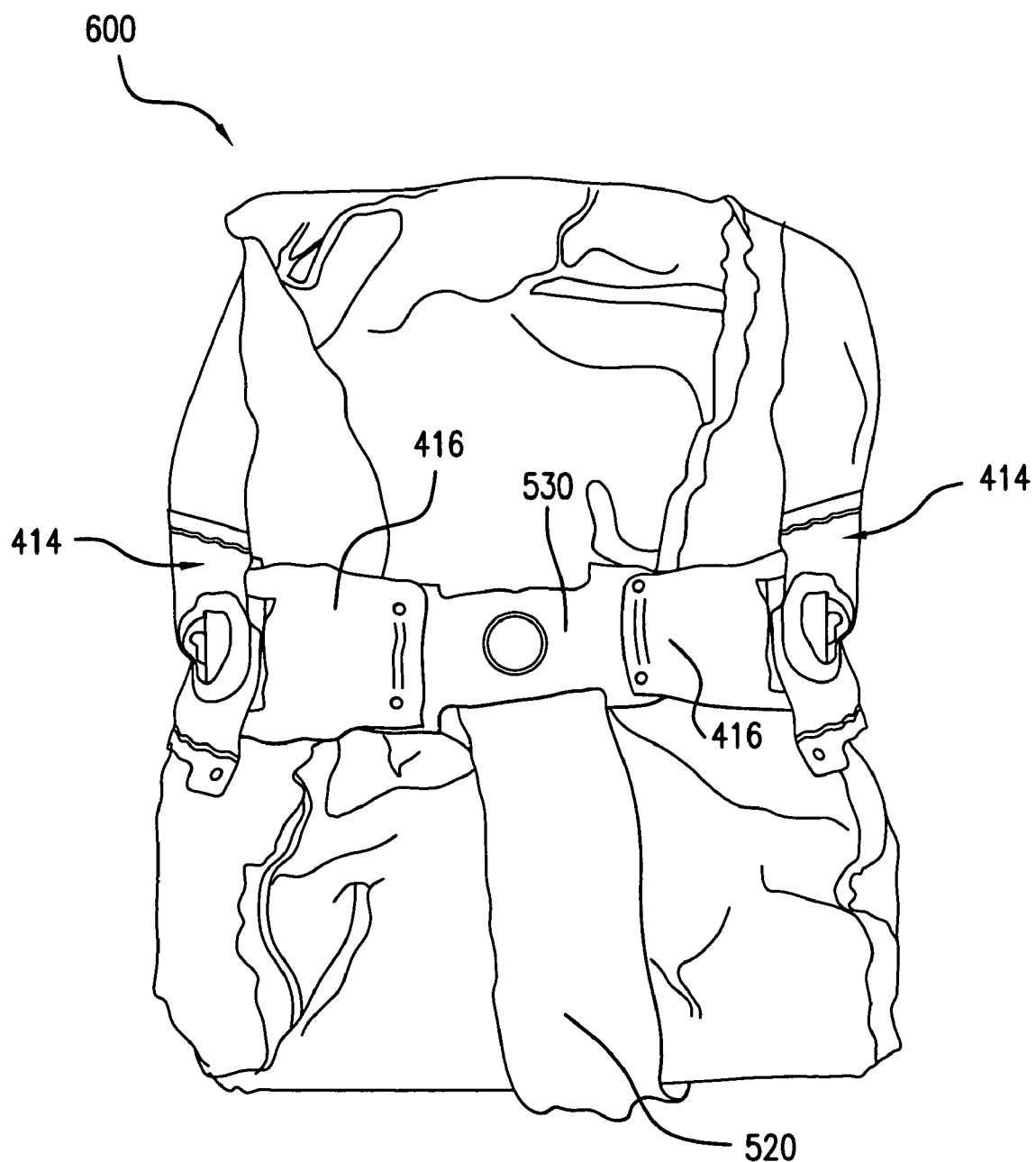
FIG. 10 is a top view of an air bag cushion with a plurality of passive venting assemblies with the air bag cushion turned inside-out, according to an embodiment.

FIG. 10 is a top view of an assembled air bag cushion 600, turned inside-out, with a plurality of passive vent assemblies 414, according to an embodiment. The passive vent assemblies 414 can be arranged according to the embodiments and examples described herein. A passive vent assembly 414 can include a tether 416 designed according to the embodiments and examples described herein. The air bag cushion 600 can include a central panel connection 530 that the tethers 416 of the passive vent assemblies 414 are connected to. The air bag cushion 600 can be, for example, a three panel cushion in which a passive vent assembly 414 is formed on each side panel and the central panel connection 530 is formed on the central panel of the cushion.

The central panel connection 530 can be positioned within the air bag cushion 600 so that the central panel connection 530 is connected to the air bag cushion 600 at a most rearward portion of the air bag cushion 600 in relation to a vehicle that the air bag cushion is located in. Such a location of the central panel connection 530 can permit the central panel connection 530 to interact with an object that the air bag cushion 600 encounters or contacts upon first contact with the object. Because the central panel connection 530 is attached to a portion of the air bag cushion 600, such as the most rearward portion of the air bag cushion 600, as the air bag cushion 600 inflates the air bag cushion pulls on the central panel connection 530 and the tethers 416 connected to the central panel connection 530, causing openings 404 in the passive vent assemblies 414 to move relative to vents 406, 408, as described in the embodiments and examples herein. According to such an arrangement, when the most rearward part of the air bag cushion 600 encounters or contacts an object during deployment of the air bag cushion, the central panel connection 530, and thus the tethers 416, will be immediately affected by the contact of the air bag cushion 600 with the object. For example, such an encountered or contacted object can cause the most rearward portion of the air bag cushion 600 to be forced inward, causing the force applied to the central panel connection 530 and tethers 416 to be lessened or nullified. If the air bag cushion 600 encounters an object, or an object restricts the inflation path of the air bag cushion 600, the tethers 416 of the passive venting assemblies 414 are designed so that the passive vents 406, and discrete vent 408, in the air bag cushion are not closed, blocked, or substantially closed or blocked, permitting inflation gas to vent from the air bag cushion 600. Conversely, if the air bag cushion 600 does not encounter or contact an object, the inflation and deployment of the air bag cushion 600 causes the air bag cushion 600 to pull on the central panel connection 530 and any tethers 416 connected to the central panel connection 530. Thus, the central panel connection 530 can act as a common device for pulling on tethers 416 of different passive venting assemblies 414 in an air bag cushion 600. Such a central panel connection 530 can be used to aid in the assembly of the passive venting assemblies 414 and the air bag cushion 600. The central panel connection 530 can also be used to save material costs for the air bag cushion 600.

In a further example, the air bag cushion 600 can include a tether 520 to connect the central panel connection 530 to another portion of the air bag cushion 600. For example, the tether 520 can be connected to a front portion of the air bag cushion 600 in relation to a vehicle the air bag cushion 600 is located in, such as a location where an inflator for the air bag cushion 600 is located. The tether 520 can be used, for example, to control the deployed shape and/or size of the air bag cushion 600.

Figure 11:
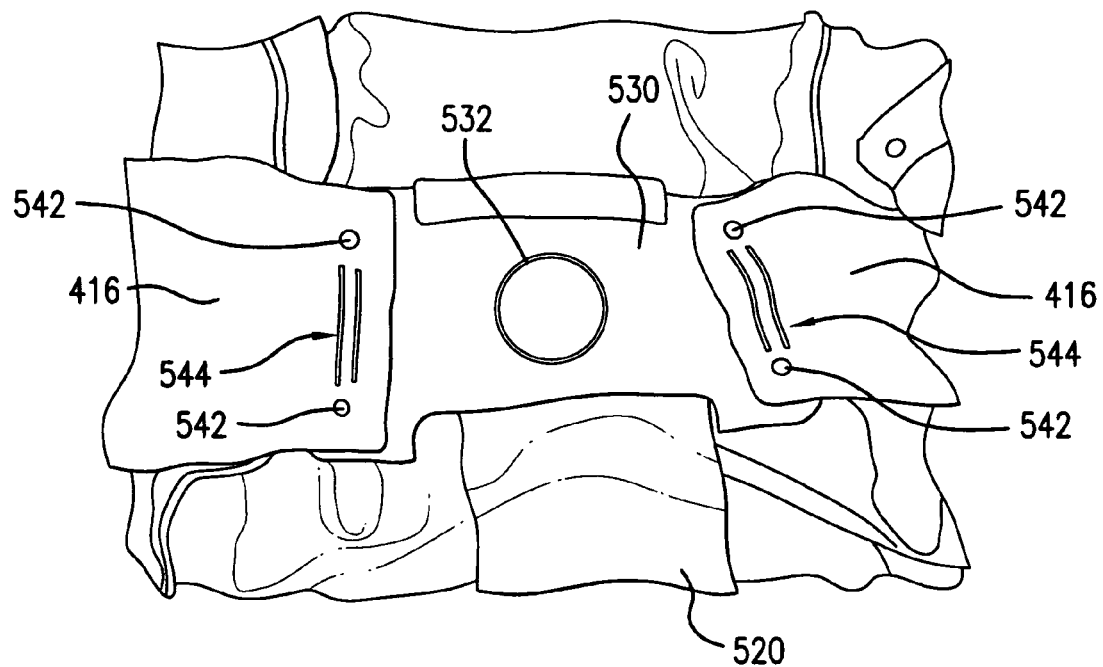
FIG. 11 is an enlarged top view of the central panel connection of FIG. 10.

FIG. 11 shows an enlarged top view of the central panel connection 530 of FIG. 10. The central panel connection 530 can be connected to a panel of the air bag cushion 600 via a joint 532. The joint 532 can be, for example, stitching or other means of bonding used in the art. The joint 532 can be used to position and fix the central panel connection 530 relative to the air bag cushion 600. For example, the joint 532 can be used to fix the central panel connection 530 at a rearward portion of the air bag cushion 600.

As shown in the example of FIG. 11, the central panel connection 530 and tethers 416 can include alignment portions 542 to aid in the placement and alignment of tethers 416 with the central panel connection 530. The alignment portions 542 can be, for example, holes in the tethers 416 and the central panel connection 530 that can be lined up so that proper positioning of the tethers 416 and the central panel connection 530 can be verified. Once the alignment of the tethers 416 and the central panel connection 530 is accomplished, the tethers 416 can be connected to the central panel connection 530 via joint 544. Joint 544 can be, for example, stitching or other means of bonding used in the art.

In addition to connecting the central panel connection 530, the joint 532 can also be used to connect a tether 520 to the panel of the air bag cushion 600. In such an arrangement the tether 520 can first be positioned relative to a panel of the air bag cushion 600 and then the central panel connection 530 can be positioned on top of the tether 520 before the joint 532 is formed to connect the central panel connection 530 and the tether 520 to the air bag panel.

Figure 12:
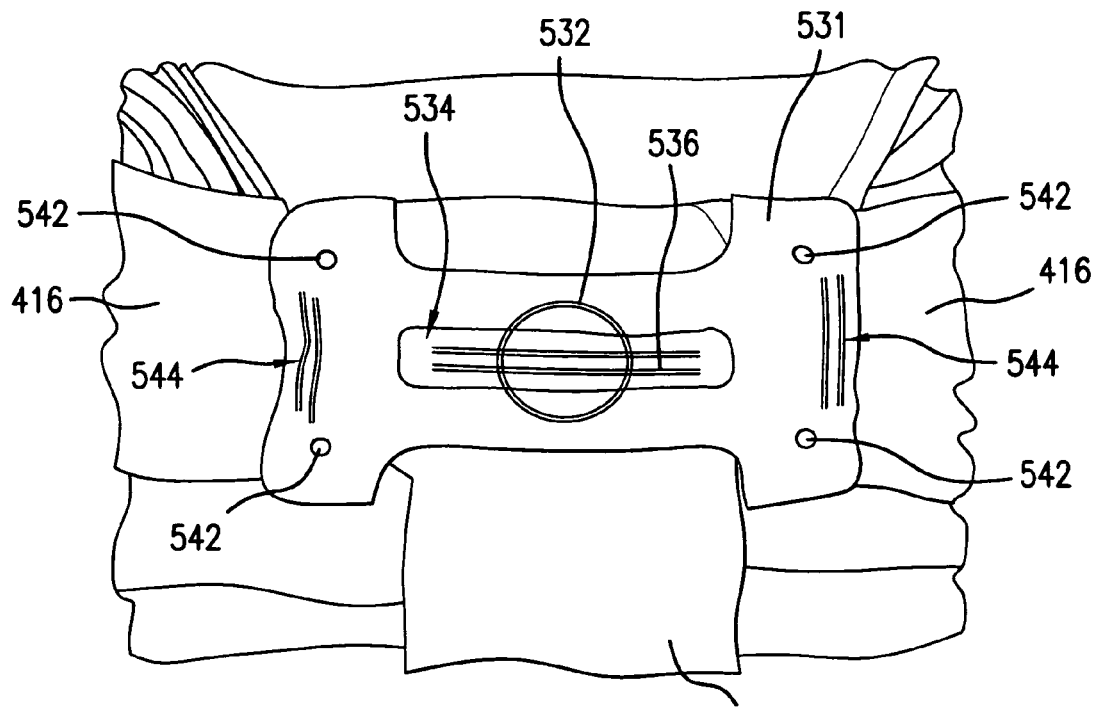
FIG. 12 is a top view of another central panel connection, according to an embodiment.

FIG. 12 shows a top view of a central panel connection 531, according to another embodiment. As shown in the example of FIG. 12, the central panel connection 531 can include an opening 534 that provides access to the air bag panel and/or tether 520 positioned beneath the central panel connection 531. For example, the opening 534 can be used to confirm proper alignment of the tether 520 and the central panel connection 531 with each other and the panel of the air bag cushion 600. Once this is accomplished, the tether 520 can be connected to the air bag panel via joint 536. The joint 536 can be formed, for example, by stitching or other joining methods used in the art. According to another example, the joint 536 can also be formed before the central panel connection 531 is positioned on top of the tether 520. After the joint 536 is formed, joint 532 can subsequently be formed to join the central panel connection 531 to the air bag panel and the tether 520, as desired. The opening 534 can be used to provide and confirm proper alignment of the central panel connection 531 with the tether 520 and/or air bag panel, as well as to provide easy access to components lying underneath the central panel connection 531, thus simplifying assembly of the air bag cushion 600.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An air bag with at least one venting assembly, comprising:
   at least one air bag panel; and
   a tether that includes an opening and at least one vent;
   wherein the tether is folded so that the opening and the vent overlay one another.

2. The air bag of claim 1, wherein the air bag panel includes at least one vent opening, wherein the vent opening of the air bag panel and the vent of the tether are configured to align with one another at least for a period of time during deployment of the air bag.

3. The air bag of claim 1, wherein a first portion of the tether including the opening is configured to move relative to a second portion of the tether including the vent during deployment of the air bag.

4. The air bag of claim 3, wherein the first portion is located underneath the second portion when the tether is folded.

5. The air bag of claim 3, wherein the vent is a passive vent.

6. The air bag of claim 5, wherein air bag and venting assembly are configured to close the passive vent if the air bag deploys without contacting an object or an out of position occupant.

7. The air bag of claim 5, wherein the tether further comprises a discrete vent.

8. The air bag of claim 7, wherein a joint is formed around the discrete vent.

9. The air bag of claim 7, wherein the air bag and venting assembly are configured so that the discrete vent remains open during deployment of the air bag.

10. The air bag of claim 1, further comprising at least one tear tab.

11. The air bag of claim 10, wherein the tear tab is located at one end of the tether and the tether is fixed to the air bag at an end of the tether opposite to the tear tab.

12. The air bag of claim 1, wherein the tether is connected to the air bag at a most rearward portion of the air bag in relation to a vehicle that the air bag is located in.

13. The air bag of claim 1, further comprising a central panel connection.

14. The air bag of claim 13, wherein the tether is connected to the central panel connection.

15. The air bag of clam 13, wherein the air bag comprises a plurality of venting assemblies, wherein each venting assembly includes a tether that is connected to the central panel connection.

16. The air bag of claim 13, wherein the central panel connection includes an opening.

17. The air bag of claim 13, further comprising a second tether that is connected to a forward portion of the air bag.

18. The air bag of claim 13, wherein the central panel connection includes at least one alignment portion.

19. The air bag of claim 13, wherein the central panel connection is connected to the air bag by a joint.

20. The air bag of claim 13, wherein the central panel connection is connected to the air bag at a most rearward portion of the air bag in relation to a vehicle that the air bag is located in.

* * * * *